US008971645B1

(12) United States Patent
Ning et al.

(10) Patent No.: US 8,971,645 B1
(45) Date of Patent: Mar. 3, 2015

(54) VIDEO CATEGORIZATION USING HETEROGENEOUS SIGNALS

(75) Inventors: Huazhong Ning, San Jose, CA (US); Zhen Li, Urbana, IL (US); Hrishikesh Aradhye, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 288 days.

(21) Appl. No.: 13/475,042

(22) Filed: May 18, 2012

(51) Int. Cl.
*G06K 9/00* (2006.01)

(52) U.S. Cl.
USPC .......................................... 382/224; 382/103

(58) Field of Classification Search
USPC .................................................. 382/181–231
See application file for complete search history.

(56) References Cited

U.S. PATENT DOCUMENTS

| 2004/0008284 | A1* | 1/2004 | Kim ............................... | 348/699 |
| 2011/0035373 | A1* | 2/2011 | Berg et al. ..................... | 707/723 |
| 2011/0085734 | A1* | 4/2011 | Berg et al. ..................... | 382/195 |

OTHER PUBLICATIONS

Jingjing Liu, Video Search Re-Ranking via Multi-Graph Propagation, AMC 2007.*

Zhou, Dengyong, et al., "Learning With Local and Global Consistency", Max Planck Institute for Biological Cybernetics, International Conference on Acoustics, Speech and Signal Processing, May 22, 2011, 8 pp.

Aradhye, Hrishikesh, et al., "Video2Text: Learning to Annotate Video Content", ICDM Workshop on Internet Multimedia Mining, 2009, 8 pp.

Cao, Liangliang, et al., "Annotating Photo Collections by Label Propagation According to Multiple Similarity Cues", Date Unknown, 9 pp., 2008.

Sargin, Mehmet Emre, et al., "Boosting Video Classification Using Cross-Video Signals," IEEE 2011, 4 pp.

* cited by examiner

*Primary Examiner* — Alex Liew
(74) *Attorney, Agent, or Firm* — Lowenstein Sandler LLP (57) ABSTRACT

A system, apparatus, and method for video categorization using heterogeneous signals are disclosed. One aspect of the disclosed embodiments is a method for categorizing a plurality of video streams. The method includes determining a plurality of features of at least some of the plurality of video streams, determining a category of a first video stream of the plurality of video stream based on its plurality of features, identifying, using a processor, a relationship between the first video stream and a second video stream of the plurality of videos, the relationship having an associated weight, and updating, using the processor, the category of the first video stream based on a first message determined using the associated weight.

20 Claims, 6 Drawing Sheets

VIDEO CATEGORIZATION USING HETEROGENEOUS SIGNALS

TECHNICAL FIELD

The present invention relates in general to video categorization.

BACKGROUND

Digital video streams can represent video using a sequence of frames or still images. Digital video is used for various purposes including, for example, remote business meetings via video conferencing, high definition video entertainment, video advertisements, and sharing of user-generated videos. Digital video can be encoded into video streams using formats such as VPx, H.264, MPEG, MJPEG, and/or others.

SUMMARY

Disclosed herein are embodiments of systems, methods, and apparatuses for video categorization.

One aspect of the disclosed embodiments is a method for categorizing a plurality of video streams. The method includes determining a plurality of features of at least some of the plurality of video streams, determining a category of a first video stream of the plurality of video stream based on its plurality of features, identifying, using a processor, a relationship between the first video stream and a second video stream of the plurality of videos, the relationship having an associated weight, and updating, using the processor, the category of the first video stream based on a first message determined using the associated weight.

Another aspect of the disclosed embodiments is a method including identifying a stored label for each data item included in a first set of a plurality of data items, extracting features of a second set of the plurality of data items, generating a first predicted label for each of the second set of data items using the extracted features, generating, using a processor, a graph including relationships between at least some of the plurality of data items, each relationship having an associated weight, and determining, using the processor, a second predicted label for each of the second set of data items by propagating labels of the plurality of data items using the graph, associated weights, first predicted labels, and stored labels.

Another aspect of the disclosed embodiments is an apparatus for categorizing a plurality of video streams. The apparatus includes a memory and a processor configured to execute instructions stored in the memory to determine a plurality of features of at least some of the plurality of video streams, determine a category of a first video stream of the plurality of video stream based on its plurality of features, identify a relationship between a first video stream and a second video stream of the plurality of videos, the relationship having an associated weight, and update the category of the first video stream based on a first message determined using the associated weight.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Video can be shared on video hosting websites using servers. Video hosting websites can generate and store various types of metadata regarding the video stored by the servers.

Video streams can have various types of associated metadata. For example, a video can have an associated category that is assigned from one of a finite number of pre-determined categories. Categories can include, for example "music," "movies," "shows," "sports," etcetera. Categories can be further subdivided, for example, a music category can further include subcategories such as "blues," "jazz," "pop," "rap," etcetera. Users of, for example, video hosting websites, can utilize the categories to locate a desired video. For example, a user can search for or click on a category "music/jazz."

The associated category can be assigned manually or can be assigned automatically/programmatically, for example, by use of machine learning. User satisfaction can be impacted by the quality of the categorization. For example, if a video that would most properly be included in "music/rap" is instead automatically categorized as "music/jazz," a user seeking a jazz video that selects the rap video due to the mis-categorization could be dissatisfied. More accurate video categorization can also permit better selection of appropriate advertisements relating to a particular video.

Video categorization using heterogenous signals can include using a combination of human evaluation of videos, machine learning classification of non-human evaluated videos, and user activity to determine categories (i.e. labels) for videos. In an implementation, video categorization using heterogenous signals can include training a multi-class classifier using features and ground truth labels (e.g., a manually assigned category) of a set of training video streams; generating predicted labels (e.g., an automatically assigned category) based on the trained classifier; generating a video relationship graph indicative of relationships between videos based on user activity; and determining final predicted labels using the ground truth labels, predicted labels, and video relationship graph.

Figure 1:
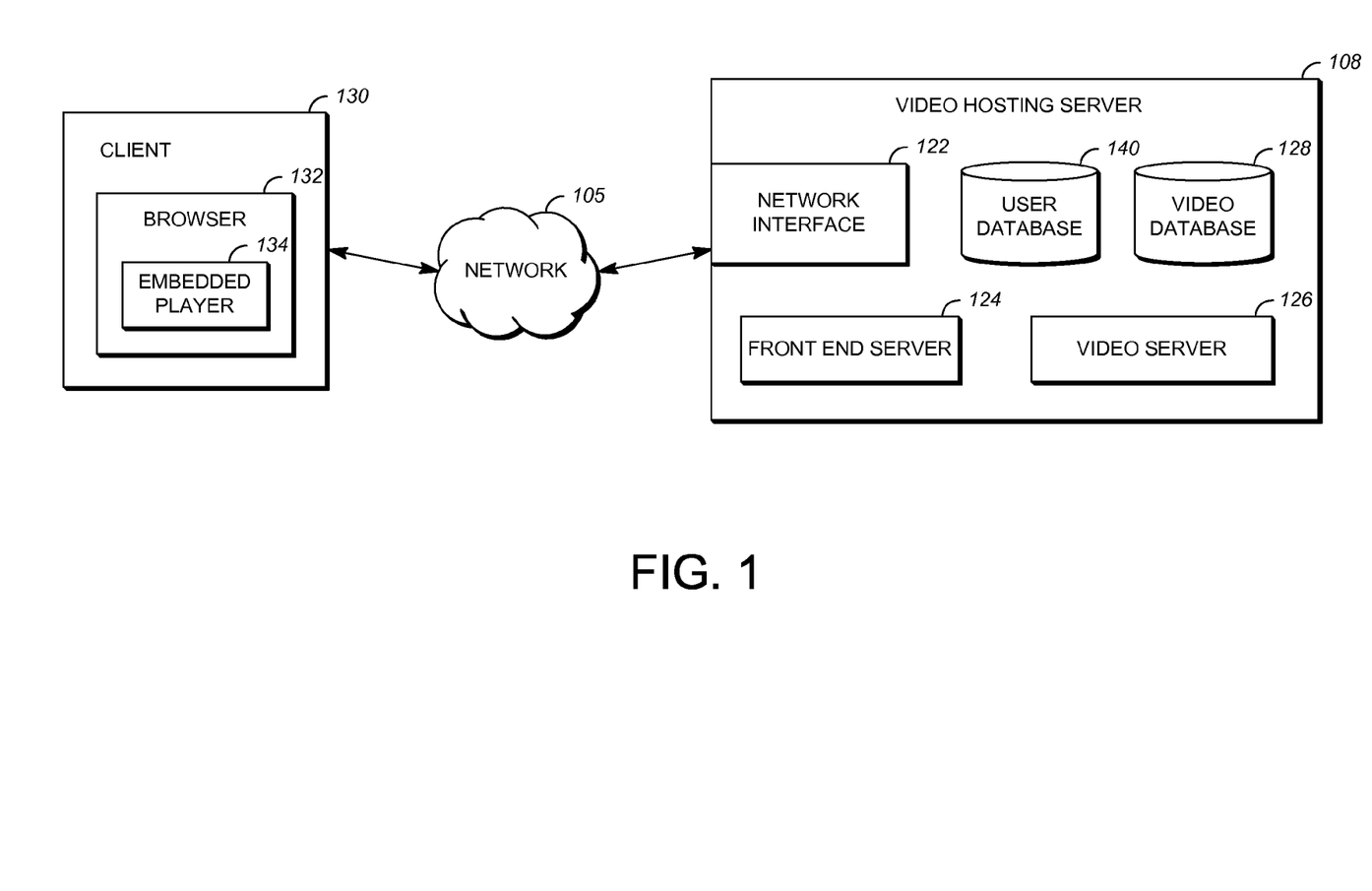
FIG. 1 is a block diagram of system architecture in accordance with one implementation.

FIG. 1 is a block diagram of system architecture in accordance with one implementation. As illustrated in FIG. 1, a video hosting server 108 can include a front end server 124, a video server 126, a network interface 122, a video database 128, and a user database 140. Other conventional features, such as firewalls, load balancers, application servers, failover servers, site management tools, and so forth are not shown but may also be utilized in various implementations. Examples of a suitable video hosting server 108 can include those that implement video hosting websites and can be adapted to operate according the teaching disclosed herein. It will be understood that the term "website" represents any system and method of providing content over a computer network and is not intended to be limited to systems that support content provided via the Internet or the HTTP protocol. The various servers can be implemented using single piece of hardware or using multiple pieces of hardware and can couple to the network 105 via network interface(s) such as the network interface 122. In general, functions described in an implementation as being performed on the server side can also be performed on the client side in other implementations if appropriate.

A client 130 executes a browser 132, and connects to the front end server 124 via a network 105, which is typically the Internet, but may also be any network, including but not limited to a LAN, a MAN, a WAN, a mobile, wired or wireless network, a private network, or a virtual private network. While only a single client 130 and browser 132 are shown, it is understood that very large numbers (e.g., millions) of clients can be supported and can be in communication with the video hosting server 108 at any time. The client 130 may include a variety of different computing devices. Examples of client devices 130 are personal computers, digital assistants, personal digital assistants, cellular phones, mobile phones, smart phones or laptop computers. In an implementation, client devices 130 can include devices other than the devices listed above.

In some embodiments, the browser 132 includes an embedded video player 134 adapted for the video file formats used in the video hosting server 108. A user can access a video stream (e.g., video) from the video hosting server 108 by browsing a catalog of videos, conducting searches on keywords, reviewing play lists from other users or the system administrator (e.g., collections of videos forming channels), or viewing videos associated with a particular user group (e.g., communities).

Video server 126 receives uploaded media content from content providers and allows content to be viewed by client 130. Content may be uploaded to video server 126 via the Internet from a personal computer, through a cellular network from a mobile telephone or PDA, or by other means for transferring data over network 105. Content may be downloaded from video server 126 in a similar manner; in one embodiment media content is provided as a file download to client 130; in an alternative embodiment, media content is streamed to client 130. The means by which media content is received by video server 126 need not match the means by which it is delivered to client 130. For example, a content provider may upload a video via a browser on a personal computer, whereas client 130 may view that video as a stream sent to a PDA. Note also that video server 126 or video hosting server 108 may itself serve as the content provider. Communications between the client 130 and video hosting server 108, or between the other distinct units of FIG. 1, may be encrypted or otherwise encoded.

Clients 130 can, as a response to user input or other input, also search for videos based on keywords, tags or other metadata. These requests can be received as queries by the front end server 124 and provided to the video server 126, which can search the video database 128 for videos that satisfy the user query or queries. The video server 126 can support searching on various data fields for a video, including fields such as title, description, tags, author, category and so forth.

Users of the clients 130 and browser 132 can upload content to the video hosting server 108 via network 105. The uploaded content can include, for example, video, audio or a combination of video and audio. The uploaded content is processed and stored in the video database 128. This processing can include format conversion (transcoding), compression, metadata tagging, and other data processing. An uploaded content file is associated with the uploading user, and so the user's account record is updated in the user database 140 as needed.

For purposes of convenience and the description of some implementations, the uploaded content will be referred to as "videos", "video files", "video streams" or "video items", but no limitation on the types of content that can be uploaded are intended by this terminology as the techniques described herein can be applied to any type of data item (e.g., the content could include other types of multimedia content, such as audio files, or non-multimedia content, such as playlist files). The uploaded videos can be assigned a video identifier when it is processed.

The user database 140 can maintain a record of all users viewing videos on the website. Each individual user can be assigned a user ID (also referred to as a user identity). The user ID can be based on any identifying information, such as the user's IP address, user name, or the like. The user database may also contain information about the user's activity on the website and/or the reputation of the user in both the video context, as well as through other applications, such as the use of email or text messaging. The user database may further contain information about membership in user groups. The user database may further contain, for a given user, a list of identities of other users who are considered friends of the user. (The term "list", as used herein for concepts such as lists of authorized users, URL lists, and the like, refers broadly to a set of elements, where the elements may or may not be ordered.)

The video database 128 can be used to store the received videos. The video database 128 stores video content and associated metadata, provided by their respective content owners. The video files can have metadata associated with each file such as a video ID, artist, video title, label, genre, category, and time length.

Figure 2:
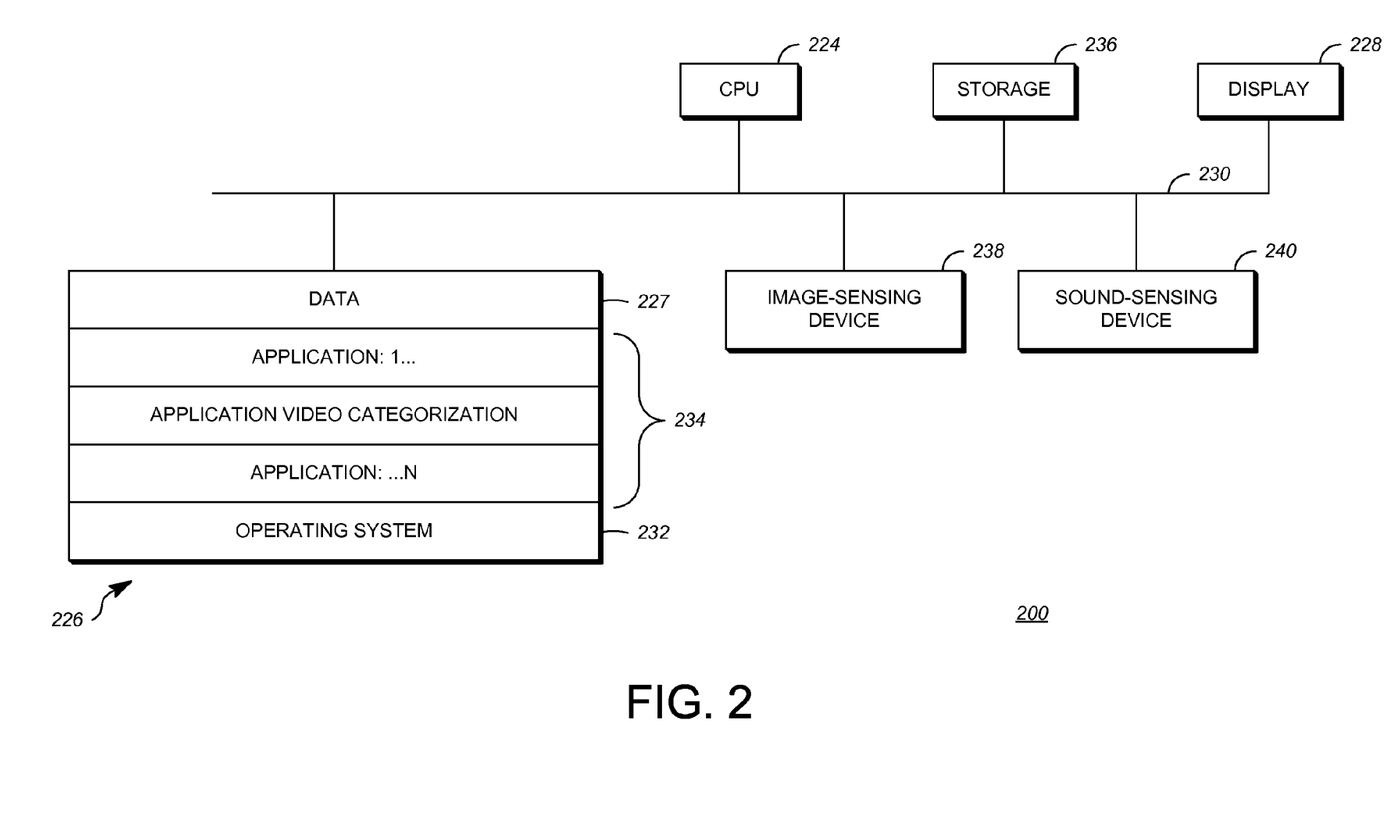
FIG. 2 is a block diagram of an exemplary computing device usable in the system of FIG. 1.

FIG. 2 is a block diagram of an exemplary computing device 200 usable in the system of FIG. 1. Computing device 200 can be, for example, a client such as client 130, a server such as video server 126, or one of multiple computing devices making up a server such as video server 126. Computing device 200 can be in the form of a computing system including multiple computing devices, or in the form of a single computing device, for example, a mobile phone, a tablet computer, a laptop computer, a notebook computer, a desktop computer, a server computer and the like.

A CPU 224 in computing device 200 can be a conventional central processing unit. Alternatively, CPU 224 can be any other type of device, or multiple devices, capable of manipulating or processing information now-existing or hereafter developed. Although the disclosed embodiments can be practiced with a single processor as shown, e.g. CPU 224, advantages in speed and efficiency can be achieved using more than one processor and/or processors with one or more processing cores.

A memory 226 in the computing device 200 can be a random access memory device (RAM). Any other suitable type of storage device can be used as memory 226. Memory 226 can include code and data 227 that is accessed by the CPU 224 using a bus 230. The memory 226 can further include an operating system 232 and application programs 234, the application programs 234 including program(s) that permit the CPU 224 to perform some or all of the techniques described herein. For example, the application programs 234 can include applications 1 through N, one or more of which can include video categorization application(s) that can perform some or all of the techniques described herein. The computing device 200 can also include a secondary storage 236, which can, for example, be a hard drive, solid state drive, or network attached storage. The data utilized by the techniques herein (e.g., video data, metadata, etc.) may contain a significant amount of information, they can be stored in whole or in part in the secondary storage 236 and loaded into the memory 226 as needed for processing.

The computing device 200 can also include one or more output devices (e.g. in the case of a client, such as client 130), such as the display 228, which can be a position sensitive display that combines a display with a position sensitive element (e.g., a touch sensitive element) that is operable to sense position inputs. The display 228 can be coupled to the CPU 224 via the bus 230. Other output devices that permit a user to program or otherwise use the computing device 200 can be provided in addition to or as an alternative to the display 228. When the output device is or includes a display, the display can be implemented in various ways, including by a liquid crystal display (LCD) or a cathode-ray tube (CRT) or light emitting diode (LED) display, such as an OLED display.

The computing device 200 can also include or be in communication with an image-sensing device 238, for example a camera, or any other image-sensing device 238 now existing or hereafter developed that can sense the image of a device user operating the computing device 200. The image-sensing device 238 can be positioned such that it is directed toward a device user that is operating the computing device 200. For example, the position and optical axis of the image-sensing device 238 can be configured such that the field of vision includes an area that is directly adjacent to the display 228, from which the display 228 is visible. The image-sensing device 238 can be configured to receive images, for example, of the face of a device user while the device user is operating the computing device 200.

The computing device 200 can also include or be in communication with a sound-sensing device 240, for example a microphone, or any other sound-sensing device now existing or hereafter developed that can sense the sounds made by the device user operating the computing device 200. The sound-sensing device 240 can be positioned such that it is directed toward the device user operating the computing device 200. The sound-sensing device 240 can be configured to receive sounds, for example, speech or other utterances made by the device user while the device user operates the computing device 200.

Although FIG. 2 depicts the CPU 224 and the memory 226 of the computing device 200 as being integrated into a single unit, other configurations can be utilized. The operations of the CPU 224 can be distributed across multiple machines (each machine having one or more of processors) which can be coupled directly or across a local area or other network. The memory 226 can be distributed across multiple machines such as network-based memory or memory in multiple machines performing the operations of the computing device 200. Although depicted here as a single bus, the bus 230 of the computing device 200 can be composed of multiple buses. Further, the secondary storage 236 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
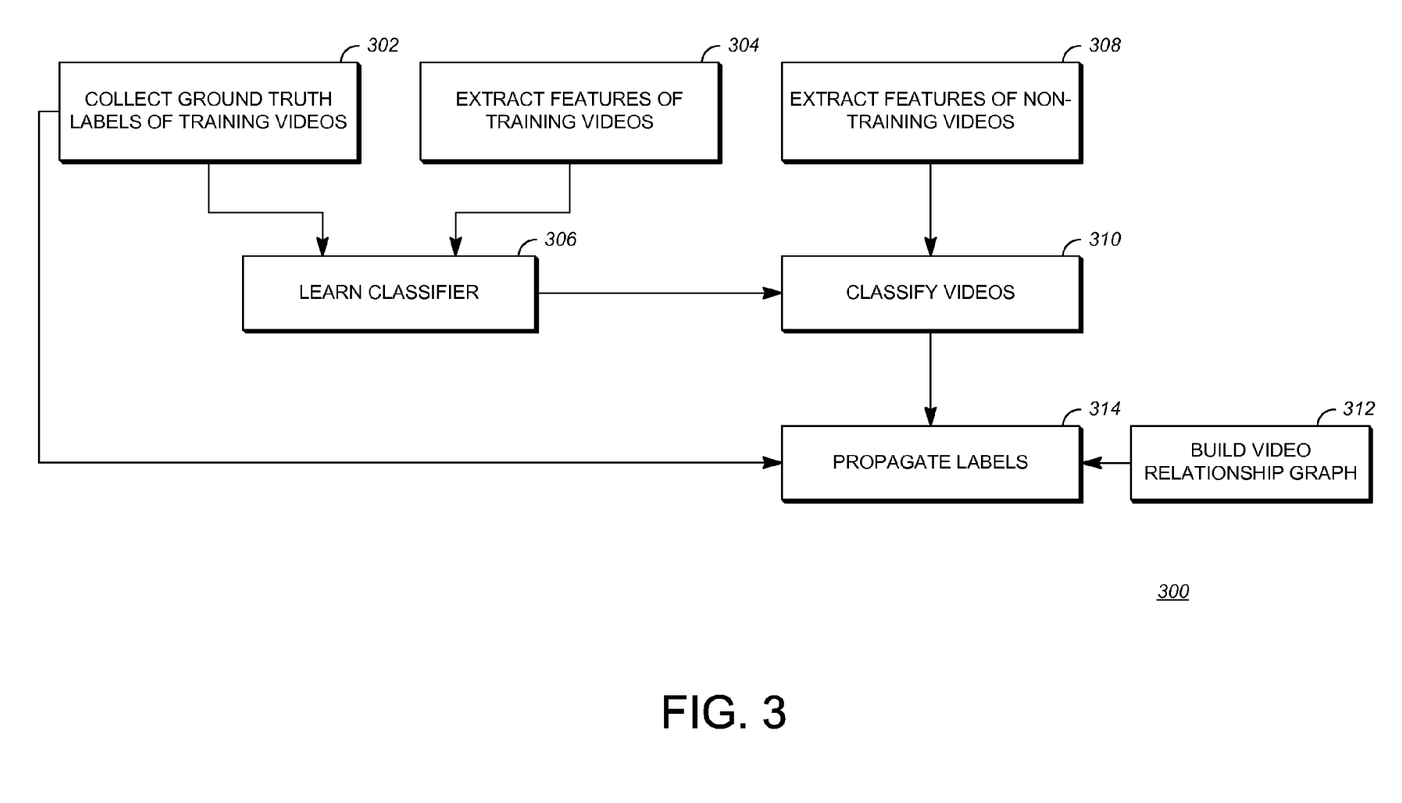
FIG. 3 is a block diagram of a technique for video categorization using heterogeneous signals.

FIG. 3 is a block diagram of a technique 300 for video categorization using heterogeneous signals. Technique 300 can include collecting ground truth labels of training videos (stage 302), extracting features of training videos (stage 304), learning a classifier (stage 306), extracting features of non-training videos (stage 308), classifying videos (stage 310), building video relationship graph(s) (stage 312), propagating labels (stage 314), and/or a combination thereof.

Technique 300 can be carried out using, for example, video hosting server 108, front end server 124, video server 126, video database 138, user database 140, or a combination thereof. In an implementation, technique 300 can be carried out using computer devices in addition to or instead of those described in FIG. 1. The stages of technique 300 can be performed using a single computer program and/or a single computer device or can be performed using multiple computer programs and/or multiple computer devices.

Video categorization using heterogeneous labels can include assigning a label to a video. The label can identify a type of information, such as a category of a video. The label(s) assigned to a video can include a ground truth label, a predicted label, or a combination thereof. A ground truth label indicates information associated with a video that can be accepted to be true. For example, ground truth labels indicating categories of videos can be assigned by human evaluators. A predicted label indicates information associated with a video that is predicted, for example, using machine learning, which can include use of a multi-class classifier.

Technique 300 can utilize both a set of training videos $V_h$ and a set of non-training videos $V_c$. In an implementation, $V_h$ can be randomly selected from a set of videos V available for viewing via a video hosting server such that $V_h \subseteq V$, and the set of non-training videos $V_c$ can be the remaining videos of set V such that $(V_h \cup V_a) = V$. In an alternative implementation, the videos of $V_h$ can be pre-determined at least in part and can include videos not available for viewing via the video hosting server. Other implementations are also available.

Technique 300 can include collecting ground truth labels of the training videos (stage 302). The ground truth labels can indicate, for example, a pre-determined category associated with a video. The ground truth labels can be collected by use of human evaluators or by any other technique that can produce labels that can be accepted to be true. The extracted ground truth labels h associated with the training video streams can be expressed as $h_v$, $v \in V_h$.

Technique 300 can include extracting features of the training videos (stage 304). A feature is a measurement of a particular aspect of a video. Features of a video can include, for example, video title, video tags, color histogram, video descriptors (e.g. CONGAS-HS), audio descriptors (e.g. Mel-frequency Cepstrum (MFCC)), and/or any other measurable quantity relating to a video or combination thereof. Features can include binary features (e.g. a feature indicative of whether a video is black and white or color) and attribute features that have a range of possible values (e.g. a length of a video). The features of a training video can be organized into a feature vector of the features associated with the video.

The ground truth labels and feature vectors generated by stages 302 and 304 can be used to learn (e.g., train) a classifier (stage 306). In implementations, the classifier can be a multi-class classifier. For example, various supervised multi-class classifiers can be used, including support vector machines (SVM), AdaBoost, decision tree, or others. In various implementations, other available machine learning classifier techniques can be utilized. Once the learning of the classifier is completed, it can be utilized to classify (i.e. assign labels to) videos that do not have ground truth labels (i.e. those outside of the training set).

Stage 308 includes extracting features of non-training videos. The set of features extracted from the non-training videos can be the same as the set of features extracted for the training videos. The features of a non-training video can be organized into a feature vector of the features associated with the video.

Technique 300 can include classifying videos (stage 310) using the learned classifier from stage 306 and the extracted features from stage 308. Classifying videos includes generating a predicted label for a video that, for example, indicates a category of a video. The classification is performed using the extracted features (i.e. without direct use of ground truth labels).

Technique 300 can include generating a video relationship graph (stage 312). The video relationship graph indicates relationships between videos. The video relationships can be represented as a undirected graph G(V,E,W) with edges E having weights W between videos V, with a node v∈V representing a video and an edge $e_{ij} \in E$ representing a relationship between videos $v_i$ and $v_j$. The edge $e_{ij}$ between videos ($v_i$, $v_j$) can have a weight $w_{ij} \in W$. In an implementation, an edge showing a relationship between videos is created when a weight determined for the videos exceeds a threshold t; and the edge is not created and the weight can be clamped to zero if the weight does not exceed the threshold.

The video relationship graph can be constructed using information extrinsic to the videos, such as user behavior logs. In one exemplary technique, a weight of a relationship between videos can be determined based on whether the videos are watched by a same user within a pre-determined time period. The weight can be increased by a pre-determined amount if the condition is satisfied, increased based on the elapsed time period, a combination thereof, and/or by using other criteria. In another exemplary technique, a weight of a relationship between videos can be determined based on whether the videos are selected from a result list of a same search query (e.g., one or more searches having the same search terms), either by the same user, different users, or a combination thereof. The weight can be increased by a pre-determined amount if both videos are selected, increased based on the association between the users that selected the videos, increased based on a number of users selecting the videos, a combination thereof, and/or by using other criteria.

Weights of the video relationship graph can be determined using a single technique or multiple techniques, using one or more of the exemplary techniques described above and/or using other techniques. For example, other user related data can be utilized, such as the data described above with respect to FIG. 1.

Technique 300 can include propagation of labels (stage 314) using ground truth labels h collected at stage 302, predicted labels c classified at stage 310, and the video relationship graph(s) determined at stage 312. Propagation of labels can be used to improve the predicted labels of some videos that may have been poorly classified using the video relationship graph and a belief propagation technique utilizing a message passing algorithm. Such a technique can include assigning and updating a current label 1 for videos over one or more iterations of the technique. In an implementation, current label 1 can indicate a current category of a video.

An implementation of the belief propagation technique can include using a unary compatibility function u and a pairwise compatibility function s, such as those described in equations 1-2 with respect to videos $v_i$ and $v_j$:

$$u_i(l_i) = \begin{cases} \delta(l_i - h_i), & \text{if } h_i \text{ exists} \\ e^{-\frac{|l_i - c_i|}{\sigma}}, & \text{otherwise} \end{cases} \quad \text{[Equation 1]}$$

$$s_{ij}(l_i, l_j) = e^{-\frac{w_{ij}|l_i - l_j|}{\omega}} \quad \text{[Equation 2]}$$

wherein
δ( ) is the Kronecker delta function;
σ is a pre-determined constant; and
ω is a pre-determined constant.

The unary compatibility function can be used to measure how much the current label/of a video is similar to the classifier predicted label video or the ground truth label of the video (if it exists). The pre-determined constant σ of the unary compatibility function can adjust the output of the function based on an amount of deviation sought between the current label $l_i$ and the predicted label $c_i$. The pairwise compatibility function can be used to measure the compatibility of the current labels of two videos. The sensitivity of the pairwise compatibility function to differences between the labels is based at least in part on (e.g., can be weighted based on) the value of the weight w. The pre-determined constant ω of the pairwise compatibility function can adjust the output of the function based on an amount of deviation sought between the current labels $l_i$ and $l_j$.

The unary compatibility and pairwise compatibility functions can be utilized in a message passing equation, such as the one described in equation 3 with respect to videos $v_i$ and $v_j$:

$$m_{ij}^{new}(l_j) = \sum_{l_i} s_{ij}(l_i, l_j) u_i(l_i) \prod_{k \in N(i)/j} m_{ki}^{old}(l_i) \quad \text{[Equation 3]}$$

wherein
N(i)/j is the set of videos that has a relationship (i.e. edge) with i except for j;
$m_{ij}^{new}$ is the message from $v_i$ to $v_j$ for a current iteration; and
$m_{ki}^{old}$ are the messages to $v_i$ for the last iteration.

The message passing equation $m_{ij}^{new}$ as shown describes a message from $v_i$ to $V_1$. A larger value of $m_{ij}^{new}$ is indicative that the marginal probability $P(l_j)$ that $l_j$, is the "best" label for $v_i$ is high based on the relationships of $v_i$. The message passing equation $m_{ij}^{new}$ can consider the pairwise compatibility of various potential labels of video $v_i$ with a current label $l_j$, of video $v_j$ and the unary compatibility of the various potential labels of video $v_i$. For example, the message passing equation can include summing the product of the pairwise compatibility and unary compatibility with respect to the various potential labels of video $v_i$. The message passing equation $m_{ij}^{new}$ can also consider previous messages $m_{ki}^{old}$ passed to video $v_i$. For example, the message passing equation can include generating a product of previous messages.

Messages can be initialized to uniform values (e.g., 1), or to random values (e.g., positive values). Messages can be updated iteratively until they have converged. For example, convergence can be determined if the changes of messages between successive iterations are smaller than a pre-defined threshold.

Once the messages converge, a final predicted label for a video can be determined using a belief read-out equation b and a final prediction equation l', such as those described in equations 4 and 5:

$$b_i(l_i) = u_i(l_i) \prod_{k \in N(i)} m_{ki}(l_i) \quad \text{[Equation 4]}$$

$$l'_i = (\text{argmin})_l b_i(l) \quad \text{[Equation 5]}$$

The belief read-out equation b can be used to approximate the marginal probability $P(l_i)$ that $l_i$ is the "best" label for $v_i$. The final predicted label for $v_i$ can be determined using final prediction equation $l_{i^*}$.

The final predicted labels of the videos can be stored, for example, by video hosting server 108 in video database 128. The final predicted labels can indicate, for example, a final category of each of the videos. The final predicted labels can be used, for example, to produce search results responsive to requests made by users of a video hosting website and/or to generate advertisements related to a particular video served via a video hosting website.

The stages described above with respect to FIG. 3 are exemplary, and in implementations, stages can be added, stages can be removed, stages can be modified, stages can be split apart, and stages can be combined. For example, in an implementation, stage 314 can include use of equations in addition to equations 1-5 or may use modified version(s) of any or all of equations 1-5. As another example, in an implementation, stages of technique 300 can be performed at different times or using different computing devices. In one example, stages 302-306 can be performed at differing times and using different computing devices than stages 308-312.

Figure 4:
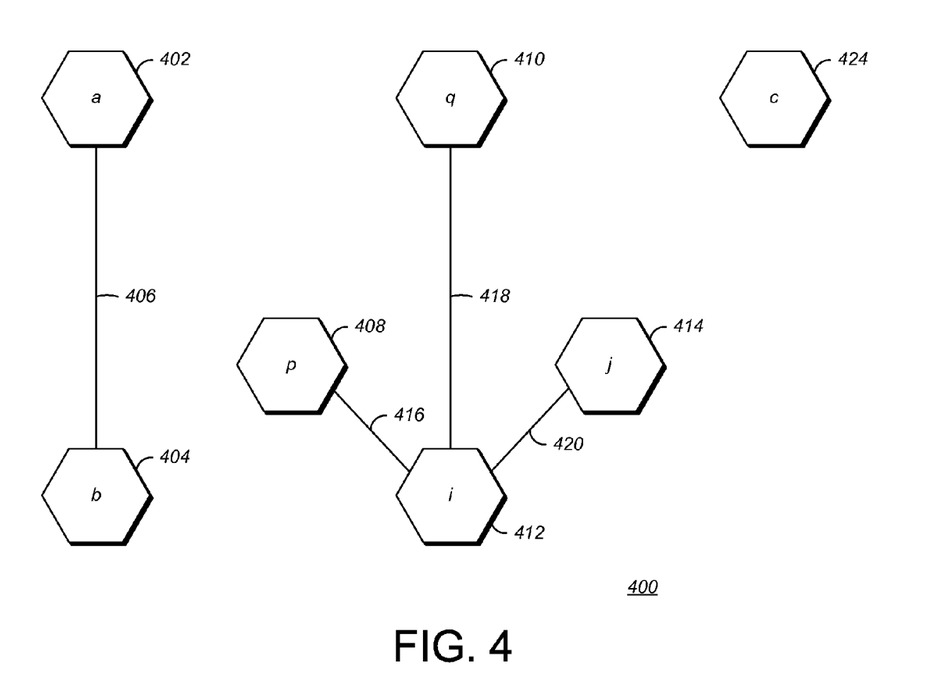
FIG. 4 is a depiction of an exemplary video relationship graph.

FIG. 4 is a depiction of an exemplary video relationship graph 400. The exemplary graph 400 includes nodes 402, 404, 408, 410, 414, and 424 each representative of a video. The exemplary graph 400 further includes edges 406, 416, 418, and 420, each representative of a relationship between videos. Each edge can have an associated weight and can be created such as described above with respect to FIG. 3.

Figure 5:
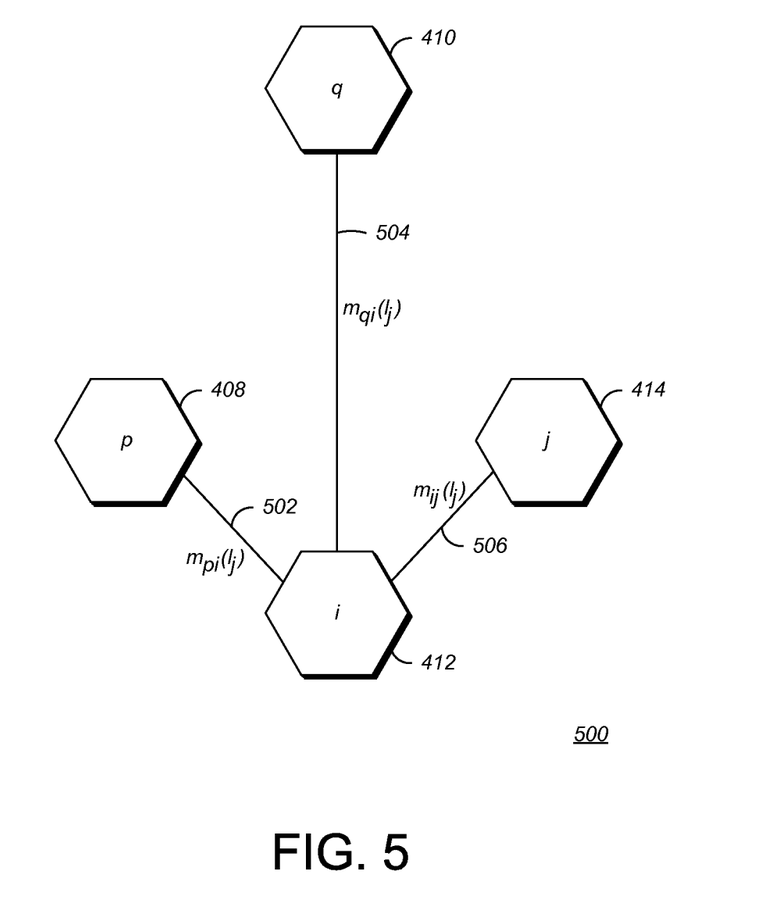
FIG. 5 is a depiction of an exemplary video relationship graph including messages used for propagating labels.

FIG. 5 is a depiction of an exemplary video relationship graph 500 including messages used for propagating labels. The messages of video relationship graph 500 can include messages 502, 504, and 506. The messages are shown being passed in one direction for simplicity, however nodes 408, 410, 412, and 414 may also have messages passed in different directions instead of or in addition to those shown.

Messages 502, 504, and 506 can be created and updated in an iterative fashion, such as described above with respect to FIG. 3. The messages can indicate a marginal probability of a confidence level in the current label of a node based on the relationship with connected nodes, current labels of adjoining nodes, messages passed to adjoining nodes, or a combination thereof.

Figure 6:
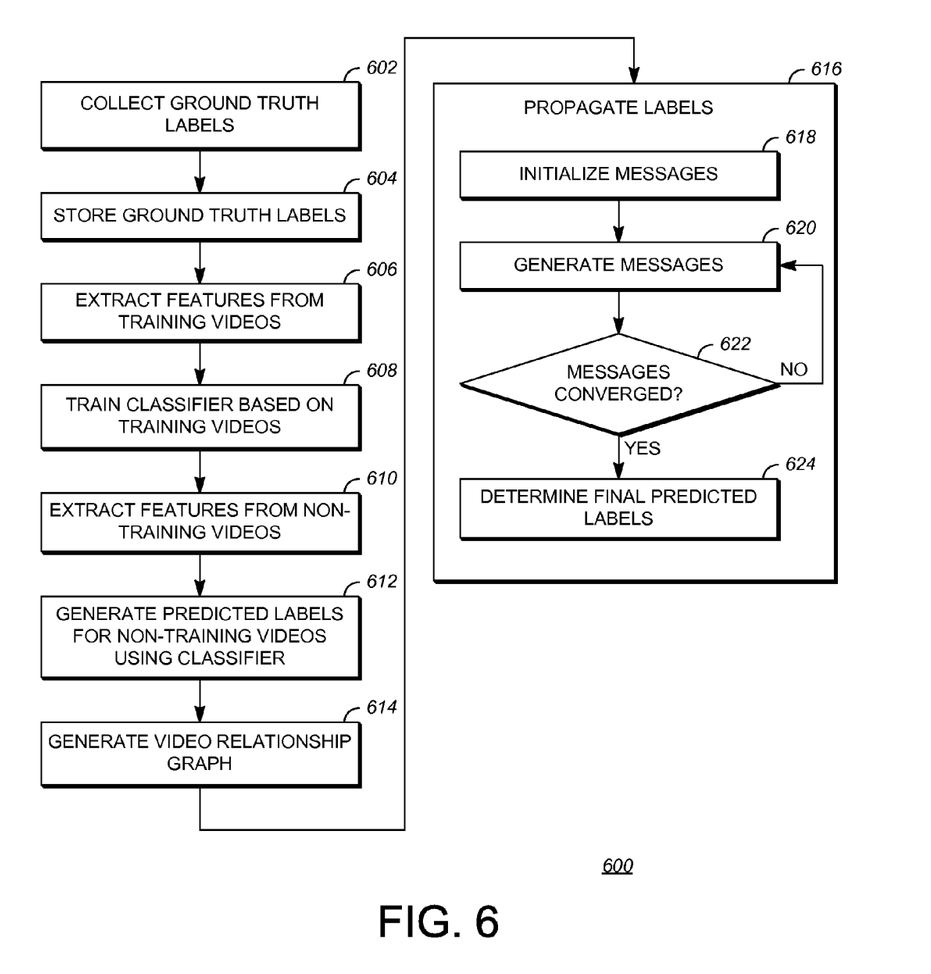
FIG. 6 is a flowchart of a technique for video categorization using heterogeneous signals.

FIG. 6 is a flowchart of a technique 600 for video categorization using heterogeneous signals. Technique 600 can be an implementation of technique 300 described above with respect to FIG. 3 and can utilize the same techniques, a subset of the techniques, or a superset of the techniques described with respect to FIG. 3. At stage 602, ground truth labels are collected for a set of training videos. Ground truth labels can be collected using human raters of training videos (e.g., video streams stored in video database 128). At stage 604, the ground truth labels are stored (e.g., in video database 128).

Features can then be extracted from the training videos at stage 606. Features can include any identifying metric or attribute of the videos. The extracted features and collected ground truth labels can be used to train a classifier at stage 608. The classifier can be, for example, a supervised multi-class classifier.

Next, features can be extracted from non-training videos at stage 610. The extracted features for the non-training videos can be the same set of features extracted from the training videos at stage 606. Predicted labels for the non-training videos can be generated using the extracted features and the trained classifier at stage 612.

A video relationship graph can be generated at stage 614. The video relationship graph can be an undirected graph that indicates relationships between training videos, non-training videos, or a combination thereof and associated weights of the relationships. Labels (e.g., the ground truth labels of stage 602, predicted labels of stage 612, or a combination thereof) can be propagated at stage 616. Label propagation can utilize the ground truth labels, predicted labels, and the video relationship graph to refine the prediction of labels.

Label propagation at stage 616 can include initializing messages at stage 618, generating messages at stage 620, determining whether messages have converged at stage 622, determining final predicted labels at stage 624, or a combination thereof.

First, messages can be initialized at stage 618 to, for example, a common initial value or to random positive values. Messages can be generated between nodes of the video relationship graph (e.g., videos) at stage 620 using, for example, equations 1-3. A determination can be made as to whether the messages have converged at stage 622. If the messages have not converged, control can return to stage 620. Control can iterate between stages 620 and 622 until the messages have converged.

Once the messages have converged, control can pass to stage 624 to determine the final predicted labels of the videos. The final predicted labels can be determined, for example, by using equations 4-5.

The stages described above with respect to FIG. 6 are exemplary, and in implementations, stages can be added, stages can be removed, stages can be modified, stages can be split apart, and stages can be combined. For example, in an implementation, stages 602-608 can be performed at a different time and/or by using a different server(s) and/or processor(s) than stages 610-624. As another example, in an implementation, stages can be performed in parallel, for example, stages 610 and 612 can be performed in parallel with stage 614.

The foregoing description describes only some exemplary implementations of the described techniques—other implementations are available. For example, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described herein do not necessarily have to be implemented in the same manner.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer. The computer program, when executed, can carry out any of the respective techniques, algorithms and/or instructions described herein. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least some implementations of this disclosure are suited to a wide variety of computer network systems over numerous topologies. Within this field, the configuration and management of large networks comprise storage devices and computers that are communicatively coupled to dissimilar computers and storage devices over a network, such as the Internet.

The above-described embodiments have been described in order to allow easy understanding of the disclosure and are not intended to limit the scope of the disclosure. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for categorizing a plurality of video streams comprising:
    determining a plurality of features of at least some of the plurality of video streams;
    determining a category of a first video stream of the plurality of video streams based on a plurality of features of the first video stream;
    identifying, by a processor using information extrinsic to the plurality of video streams, a relationship between the first video stream and a second video stream of the plurality of video streams, the relationship having an associated weight based on user activities; and
    updating, using the processor, the category of the first video stream based on the plurality of features of the first video stream and a first message determined using the associated weight of the relationship between the first video stream and the second video stream.

2. The method of claim 1, wherein a third video stream of the plurality of video streams has a pre-determined category and updating the category of the first video stream is further based on a second message determined using the pre-determined category and an associated weight of a relationship between the first video stream and the third video stream.

3. The method of claim 1, wherein the first message is determined using a compatibility function that produces a value based on a difference between a current category of the first video and a current category of the second video that is weighted using the associated weight.

4. The method of claim 3, wherein the first message is determined using a product of previous messages from a set of video streams other than the first or second video stream to the second video stream.

5. The method of claim 4, wherein the first message is one of a plurality of messages and updating the category is performed iteratively until the plurality of messages converge.

6. The method of claim 5, further comprising:
    determining a final category of the first video stream once the messages converge based on a belief read-out equation and a final prediction equation.

7. The method of claim 1, wherein determining the category of the first video stream of the plurality of video streams is further based on a multi-class supervised classifier that has been trained using a plurality of training video streams.

8. The method of claim 7, wherein at least one of the plurality of training video streams is included in the plurality of video streams.

9. The method of claim 7, wherein the multi-class supervised classifier is trained using a pre-determined category assigned to each training video stream of the plurality of training video streams.

10. The method of claim 1, wherein the relationship between the first video stream and the second video stream is created after a determination that a weight calculated for the relationship between the first video stream and the second video stream is greater than a threshold value.

11. The method of claim 1, wherein the relationship between the first video stream and the second video stream is identified-based on user behavior logs.

12. The method of claim 11, wherein the relationship between the first video stream and the second video stream is identified if each of the video streams are watched by a same user within a pre-determined time period.

13. The method of claim 11, wherein the relationship between the first video stream and the second video stream is identified if each of the video streams are watched after being selected from a result list of a same search query.

14. A method comprising:
  identifying a stored label for each data item included in a first set of a plurality of data items;
  extracting features of a second set of the plurality of data items;
  generating a first predicted label for each of the second set of data items using the extracted features;
  generating, by a processor using information extrinsic to the data items, a graph including relationships between at least some of the plurality of data items, each relationship having an associated weight based on user activities; and
  determining, using the processor, a second predicted label for each of the second set of data items by propagating labels of the plurality of data items using the graph, associated weights of the relationships, first predicted labels, and stored labels.

15. The method of claim 14, wherein the ground truth labels, predicted labels, and final predicted labels each are indicative of a category of a data item of the plurality of data items.

16. The method of claim 15, wherein each of the plurality of data items is representative of a video stream of a plurality of video streams.

17. The method of claim 14, wherein propagating labels includes iteratively passing messages between data items, the messages generated based upon differences between labels of data items having relationships and the respective weights of the relationships.

18. The method of claim 17, wherein a message from a first data item to a second data item of the plurality of data items is further generated based on messages to the first data item from data items other than the second data item.

19. The method of claim 14, wherein generating the first predicted label for each of the second set of data items further uses a classifier, the method further comprising:
  extracting features of the first set of data items; and
  training the classifier using the extracted features of the first set of data items and the stored ground truth labels.

20. An apparatus for categorizing a plurality of video streams, the apparatus comprising:
  a memory; and
  a processor configured to execute instructions stored in the memory to:
    determine a plurality of features of at least some of the plurality of video streams,
    determine a category of a first video stream of the plurality of video streams based on a plurality of features of the first video stream;
    identify, using information extrinsic to the plurality of video streams, a relationship between the first video stream and a second video stream of the plurality of video streams, the relationship having an associated weight based on user activities, and
    update the category of the first video stream based on the plurality of features of the first video stream and a first message determined using the associated weight of the relationship between the first video stream and the second video stream.

* * * * *